United States Patent [19]

Mohr et al.

[11] Patent Number: 5,197,354
[45] Date of Patent: Mar. 30, 1993

[54] ANGULAR DRIVE INTERMITTENT MOTION MECHANISM

[75] Inventors: Henry G. Mohr; Randall L. Sparks, both of Carthage, Mo.

[73] Assignee: Leggett & Platt Incorporated, Carthage, Mo.

[21] Appl. No.: 873,585

[22] Filed: Apr. 21, 1992

Related U.S. Application Data

[63] Continuation of Ser. No. 612,184, Nov. 13, 1990, abandoned.

[51] Int. Cl.$^5$ .................. F16H 27/06; F16H 27/08; F16H 35/02
[52] U.S. Cl. .................. 74/820; 74/84 R; 74/393; 74/435; 74/436; 74/416
[58] Field of Search .............. 74/84 R, 393, 435, 436, 74/416, 820

[56] References Cited

U.S. PATENT DOCUMENTS

| | | | |
|---|---|---|---|
| 1,167,017 | 1/1916 | Proksa. | |
| 1,231,062 | 6/1917 | Pietzsch et al. | |
| 3,153,952 | 10/1964 | Thoma | 74/822 |
| 3,180,160 | 4/1965 | Hays | 74/84 |
| 3,199,373 | 8/1965 | Veale | 74/679 |
| 3,236,116 | 2/1966 | Hafferkamp et al. | 74/436 |
| 3,456,529 | 7/1969 | Petroff | 74/817 |
| 3,478,616 | 11/1969 | Smith | 74/436 |
| 3,583,258 | 6/1971 | Fouse | 74/820 |
| 3,638,513 | 2/1972 | Poludetkin et al. | 74/820 |
| 3,835,723 | 9/1974 | Zugel | 74/436 |
| 3,918,313 | 11/1975 | Montagnino | 74/435 X |
| 4,563,910 | 1/1986 | Miyazaki et al. | 74/820 |
| 4,644,819 | 2/1987 | Zugel | 74/665 B |
| 4,681,198 | 7/1987 | Costa Mas | 192/3 S |
| 4,688,442 | 8/1987 | Seragnoli et al. | 74/426 |
| 4,699,265 | 10/1987 | Houle | 198/575 |

*Primary Examiner*—Allan D. Herrmann
*Attorney, Agent, or Firm*—Wood, Herron & Evans

[57] ABSTRACT

An intermittent drive mechanism is provided for intermittently driving an output shaft with an input shaft that has an axis that intersects the axis of the output shaft at an angle. A driving element on the input shaft couples with a driven element on the output shaft through pairs of corresponding accelerating and decelerating pin and slot combinations which engage each other intermittently at the surface of an imaginary sphere which is centered at the intersection point of the shafts. Embodiments are provided both with and without intermittent driving gears on the elements to maintain the output shaft rotation at constant maximum velocity through a predetermined arc. The slots are curved, preferably in circular arcs, so as to optimize acceleration and the rate of change of acceleration (jerk), particularly as the output shaft approaches and leaves the point of maximum angular velocity. Preferably, acceleration and deceleration are zero approaching and leaving the maximum velocity point, where, with the geared version, jerk is also preferably zero. Maximum acceleration is preferably minimized.

21 Claims, 5 Drawing Sheets

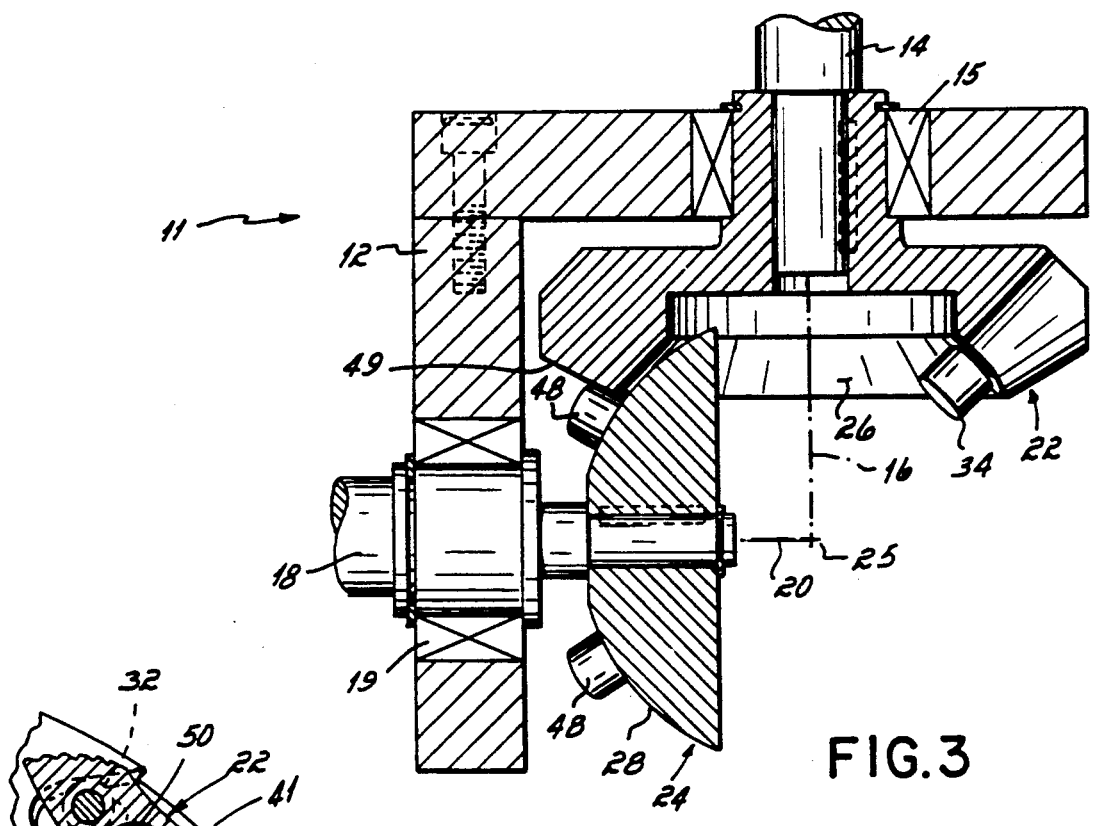
FIG. 3
FIG. 5
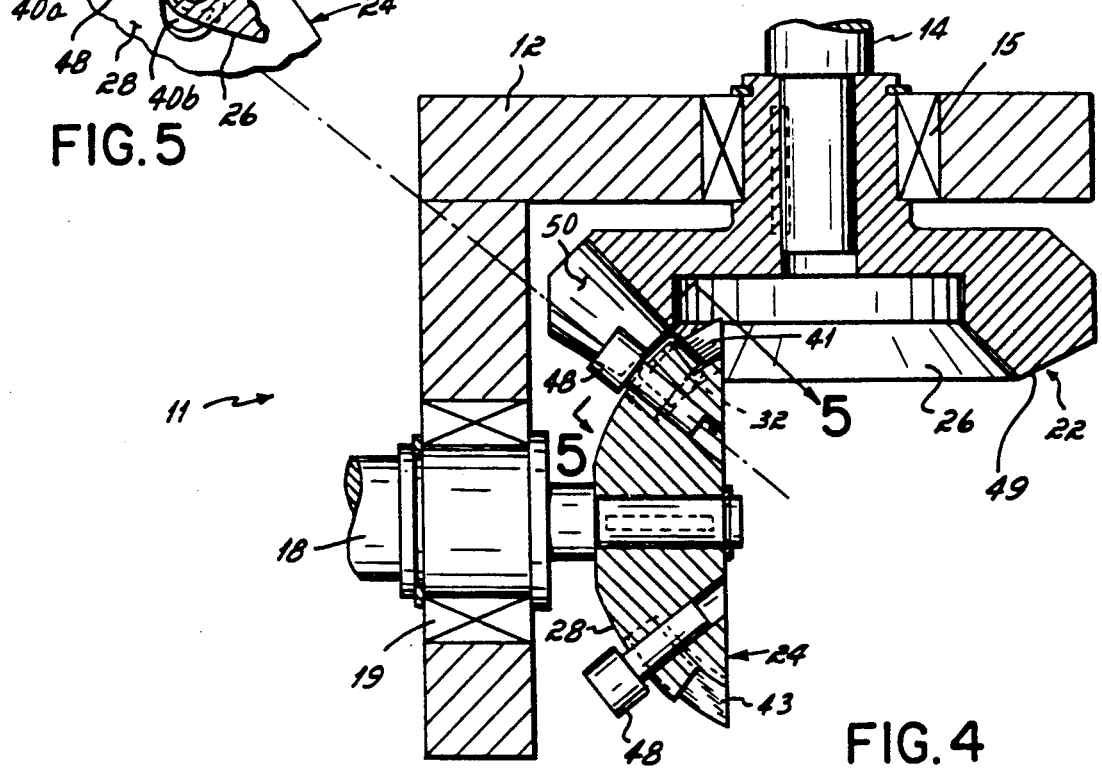
FIG. 4

ANGULAR DRIVE INTERMITTENT MOTION MECHANISM

This application is a continuation of application Ser. No. 07/612,184, filed Nov. 13, 1990 now abandoned.

The present invention relates to indexing drives or intermittent motion mechanisms and, more particularly, to indexing drives having an intermittently driven output shaft which intersects the input shaft at an angle.

BACKGROUND OF THE INVENTION

Indexing drives for imparting intermittent motion have existed in the prior art. One such classic device is known as the Geneva mechanism. With the Geneva mechanism, constant rotation of an input shaft is converted to intermittent angular rotation of an output shaft which is parallel to the input shaft. The Geneva mechanism typically has a single pin, carried by the input shaft, which moves into and out of a series of straight radial slots in the periphery of a disk on the output shaft. The pin engages one of the slots in the disk as the input shaft rotates, accelerating and then decelerating the output shaft from and back to a rest position while rotating it through an angle of, for example, 120 degrees or less.

The Geneva mechanism has many limitations. The limitations are discussed, for example, in U.S. Pat. No. 3,443,455, which is directed toward an improvement in intermittent motion devices. A further improvement is disclosed in U.S. Pat. No. 3,835,723. These improvement devices employ a pair of pins and pairs of corresponding slots. One of the pins and one slot of each pair cooperates to accelerate the output shaft from rest to a maximum angular velocity and the other one of the pins and the other slot of each pair cooperates to decelerate the output shaft back to rest or zero angular velocity. These improved devices sought to overcome some of the disadvantages of the earlier Geneva and other types of indexing mechanisms, particularly the abrupt changes in acceleration of the output shafts such as occur in the Geneva mechanism upon engagement and disengagement of a radial slot on the output shaft by the pin on the input shaft. In the devices of the above-identified U.S. patents, the pair of pins on the driving shaft engage a corresponding pair of slots on the driven or output shaft, each of which has an opposite curve that determines the output shaft's motion, thus providing greater flexibility than with a single slot of the conventional Geneva mechanism by allowing shaping of the slots. The devices of the above-mentioned patents employ circular slots.

Providing an improved indexing mechanism in a right angle drive has presented greater difficulty. One such device is disclosed in U.S. Pat. No. 3,583,258. That device seeks to solve one of the problems found in prior mechanisms by eliminating the abrupt acceleration from, and deceleration to, zero angular velocity by providing a hemispherical slotted output member in which a pin on the input or driving element engages the slot of the output or driven element through a full 180 degrees. In the device described in U.S. Pat. No. 3,583,258, the pin enters the slot tangent to the slot direction in order to provide smooth beginning and ending acceleration at the rest position. With such a device, the hemispherical surface terminates in a planar edge which lies in a diameter plane through the center of the hemisphere, the plane being at right angles to the output axis of rotation and containing the input axis of rotation. The motion of the output element with such a device is described therein as otherwise corresponding to that of a traditional Geneva mechanism.

The traditional Geneva mechanism produces an output motion which has two additional undesirable features. The Geneva mechanism has a relatively high maximum acceleration and maximum deceleration, and additionally produces a rapid transition from acceleration to deceleration at the maximum angular velocity point. This imparts a rapid acceleration change rate, or jerk, to the output shaft. The jerk is in the form of a sudden torque reversal. This may be represented by an equation of motion in which the third derivative of the angle of the output shaft, or the rate of change of the angular acceleration of the output shaft, is not zero, but rather is a high negative number at the point of maximum output angular velocity. Such motion characteristics impart significant stress to the output drive train and to objects being handled, processed or moved by the driven apparatus, as well as wear to the mechanism itself.

Devices of the prior art have not provided the nonplanar indexing mechanism, that is one in which the input and output shafts are not parallel, which is capable of overcoming high acceleration, and overcoming a high rate of change of acceleration, particularly at maximum velocity and at transition points in the intermittent drive cycle where mechanical components make and break contact. The prior art has further failed to provide an indexing mechanism which has acceptable characteristics which are generally adaptable to devices in which a driving and a driven shaft intersect at an angle that may be other than 90 degrees.

SUMMARY OF THE INVENTION

It is a primary objective of the present invention to provide an indexing mechanism for intermittently driving an output shaft that intersects an input shaft at some angle, and which drives the output shaft in a smooth and acceptable manner. It is a more particular objective of the present invention to provide such an indexing mechanism that is capable of imparting intermittent motion to the output shaft with the capability of optimizing peak angular acceleration, of providing continuous angular acceleration that is preferably zero at critical points in the drive cycle, and of providing a continuous rate of change of angular acceleration that is in some embodiments also preferably zero at critical points in the cycle.

According to the principles of the present invention, there is provided an indexing mechanism for intermittently driving an output shaft having an axis that intersects that of the input shaft at a point, so as to provide desired acceleration characteristics. In the preferred embodiment, the mechanism operates to smoothly accelerate the output shaft from zero angular velocity to a maximum angular velocity and then to smoothly decelerate the output shaft back to zero angular velocity.

According to the present invention, an indexing mechanism is provided with a driving element which is mounted on the input shaft and a driven element mounted on the output shaft. Both of the elements are preferably formed with corresponding spherical surfaces that are closely spaced and both centered about the point of intersection of the two axes.

In certain preferred embodiments, one of the elements includes a set of drive pins, preferably two in number, and preferably on the driving element, which moves therewith in a plane perpendicular to the element's axis and in a circle on the surface of the sphere. The other element, preferably the driven element, contains channels which have camming surfaces that cooperate with the pins and are intermittently engaged thereby to drive the driven element about the output axis. The channels are preferably in the form of slots in the surface of the element and have radial walls which form camming surfaces that can be engaged by the pins.

In accordance with the preferred embodiment of the invention, the camming surfaces of the channels are shaped in such a way as to determine the relationship of the motion of the output shaft to the input shaft. The channels or slots are in two sections, one of which is engageable by a pin on the other element to smoothly and continuously accelerate the output shaft from zero angular velocity to a maximum angular velocity while the other is engageable by a pin on the other element to decelerate the output shaft from the maximum angular velocity to a zero angular velocity.

In certain embodiments of the present invention, the indexing mechanism drives the output shaft to a maximum angular velocity and then immediately returns it to a zero angular velocity after a fractional rotation of the output shaft through some integral segment of the complete circle such as $\frac{1}{3}$, $\frac{1}{4}$ or 1/5 the rotation. With such embodiments, the slots, or other type of channels with camming surfaces, are employed in 3, 4 or 5 pairs respectively, one slot of each pair is positioned to engage a different one of a pair of pins on the other element, which is preferably the driving element. In the alternative, a continuous slot having two camming segments may appear on the driving element to engage 3, 4 or 5 pins on the driven element. In such an embodiment in which the slot is located on the driving element, one section of the slot is shaped to accelerate the output shaft, while another section of the slot is shaped to decelerate the output shaft.

In certain other embodiments of the present invention, an indexing mechanism is provided for driving an output shaft in such a way that it accelerates from a zero angular velocity to a maximum angular velocity, then continues to rotate at a constant maximum angular velocity, and then decelerates back to zero angular velocity. With such an embodiment, additional drive means is provided, such as mating gears on the driving and driven elements on the input and output shafts, which intermittently engage, as the accelerating pin and shaft disengage, after the output shaft has been driven to its maximum angular velocity, to continue rotation of the output shaft through an angle at fixed angular velocity. Then, as the decelerating pin and slot engage to begin deceleration of the output shaft back to zero velocity, the additional drive means disengage. Such embodiments are particularly useful for moving the output shaft through large fractional angles, or through angles of a full rotation or more, such as 1, 1½, or 2 rotations of the output shaft.

According to certain embodiments of the present invention, various specific shapes of the channel walls or camming surfaces are provided. Preferably, the slot or channels are curved in such a way that the pins engage the channels with the pins moving into and out of the slots. The slots are curved, preferably in a circle which has its center on the surface of the sphere outside of the circle of rotation of the pins on the input shaft element. Preferably, the circle is tangent to the circle of rotation of the driving pins at the point of initial or final engagement of a pin with the corresponding slot at zero output velocity. Accordingly, the center of the circle on which the slot lies is in a plane which contains the input axis, and the point of contact of the pin with the slot at the zero output shaft velocity contact point, including the center of the slot's circle. The radius of the slot curvature arc on the surface of the sphere is optimized, either empirically or by computation as set forth herein. The selection of slot radius precisely locates the center of the slot curve at a point on the surface of the output drive element. Preferably, the acceleration and deceleration slots are symmetrical about a plane through the center of the output shaft angle of incremental rotation. Such slot curvature imparts a smooth transition from maximum acceleration or deceleration as the output shaft accelerates to, or decelerates from, maximum angular velocity.

The location of the center of the slot curvature circle elsewhere can provide for a zero rate of change of acceleration at other points such as at the transition points to and from zero angular velocity. Similarly, as with other embodiments of the invention, the slot curvature may assume a curve which is other than a circular arc, which can be made to exhibit a smooth rate of change of acceleration at various points, or to optimize the acceleration by, for example, minimizing the maximum acceleration. A smooth rate of change to and from zero rate of change of acceleration approaching the maximum velocity is provided in the preferred embodiment to prevent imparting rapid torque reversal, or other rapid rate of change of acceleration, or jerk, to the output shaft, particularly with the embodiments that employ the constant velocity drive means or gear drive between the input and output elements.

The preset invention has the advantages of providing an indexing device which functions at various angles of relationship between the input and output shafts and which is capable of imparting a driving relationship to the input and output shafts to provide various desired functions of angular velocity, acceleration or rate of change of acceleration in relation to the input angular velocity.

These and other objectives and advantages of the present invention will be more readily apparent from the following detailed description of the drawings in which:

BRIEF DESCRIPTION OF THE DRAWINGS

FIG. 3 is a cross-sectional view along the line 3—3 of FIG. 1.

FIG. 4 is a cross-sectional view along the line 4—4 of FIG. 2.

FIG. 5 is a fragmentary view partially in cross-section along the line 5—5 of FIG. 4.

DETAILED DESCRIPTION OF THE DRAWINGS

Figure 1:
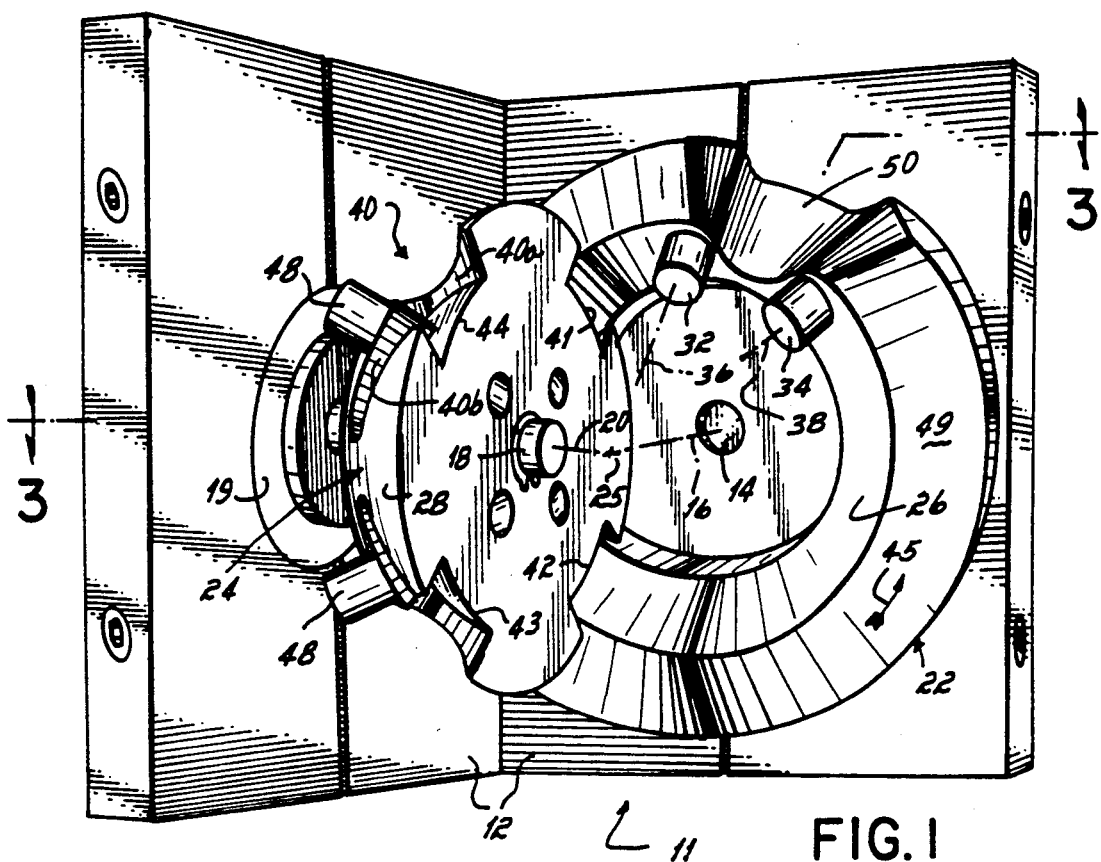
FIG. 1 is a perspective view of an indexing mechanism according to the principles of the present invention in a right angle 90° four stop embodiment.

Referring to FIG. 1, an indexing mechanism 11 according to one embodiment of the present invention is illustrated. The mechanism 11 includes a rigid frame 12 having rotatably supported therein an input shaft 14, mounted in a bearing 15 (FIGS. 3 and 4), so as to be rotatable about an axis of rotation 16. An output shaft 18 is also rotatably supported to the frame 12. The output shaft 18 is mounted in a bearing 19 and has an axis of rotation 20 which intersects the input axis 16 at an intersection point 25.

The mechanism 11, in the illustrated embodiment of the present invention, operates to translate a constant angular rotation of the input shaft 14 to intermittent angular rotation of the output shaft 18. In this illustrated embodiment, the output shaft is intermittently accelerated from a zero angular velocity up to a maximum angular velocity and then immediately decelerated back to a zero velocity, with the entire motion carrying the output shaft through a 90 degree arc of rotation. Thus, the output shaft 18 in this embodiment has four angular rest positions at 90 degree intervals around the output axis 20.

Figure 10:
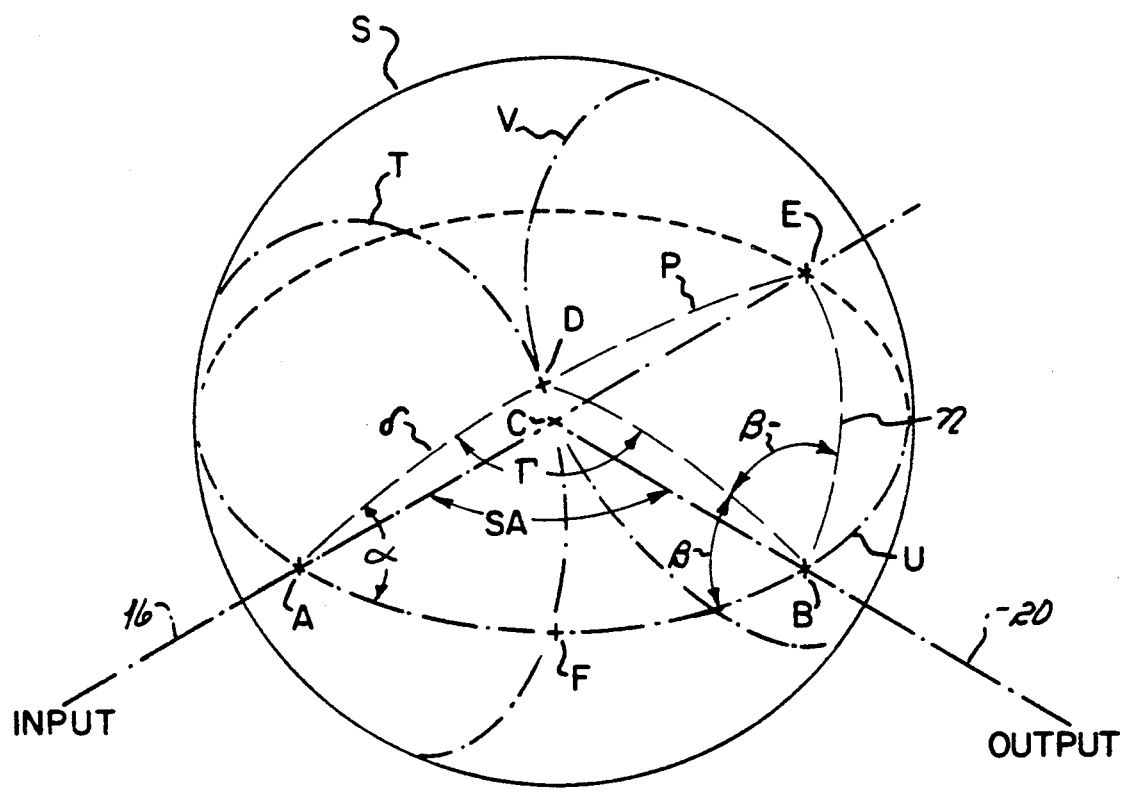
FIG. 10 is a diagram illustrating the geometric relationships of the mechanisms of FIG. 1-9.

The shafts 14 and 18 have mounted at the ends thereof intermittent drive elements 22 and 24, respectively. The element 22 is a driving element which is rigidly mounted to the end of the input shaft 14 to rotate constantly therewith. The element 24 is a driven element which is rigidly mounted at the end of the output shaft 18 to rotate therewith. The output element 24 is rotated by the driven element 22 intermittently upon engagement thereby. The elements 22 and 24 make contacting engagement on the surface of a sphere, which may be viewed as an imaginary mathematical surface S, as illustrated in FIG. 10, as centered about an intersection point C of the axes 16 and 20, which represents the center or intersection point 25 of FIGS. 1-5.

As illustrated in FIG. 1, the driving element 22 has an internal concave spherical surface 26 corresponding to and slightly larger than the surface S. Similarly, the driven element 24 has an external convex spherical surface 28 corresponding to and slightly smaller than the surface S. Thus configured, the spherical surface 28 of the driven element 24 lies on the sphere within the sphere containing the surface 26 of the driving element 22, with the surfaces 26 and 28 spaced a small distance apart with the surface of the sphere S therebetween. The mechanism 11 can be constructed with the spherical surfaces 26 and 28 of the elements 22 and 24 reversed such that the driven element 24 surrounds the driving element 22. However, the preferred embodiment is that described and illustrated.

The driving element 22 has mounted thereon, each at the same radius from the input shaft 16, a pair of drive pins 32 and 34. The pins 32 and 34 are in the form of cylindrical rollers rotatably mounted to the surface 26 and having axes 36 and 38, respectively lying on radii of the sphere, which intersect the intersection point C at the center of the sphere S. Referring jointly to FIGS. 1 and 10, as the input shaft 14 rotates about the input axis 16, the pins 32 and 34 rotate also around the input axis 16 such that their axes 36 and 38 intersect the surface of the sphere S along a circle T as shown in FIG. 10.

In the surface 28 of the driven element 24 are four pairs of cam-like surfaces or channels in the form of curved slots 40, the pairs of which 41, 42, 43, and 44, are spaced at 90 degree increments around the output axis 20. The pairs of slots 40 are identical, and each includes an acceleration slot 40a and a deceleration slot 40b. In the embodiments shown, the slots of each pair are symmetrical about an intersecting plane, though they need not be symmetrical in all embodiments of the invention. The slots 40 are so positioned such that, when the input shaft 14 and drive element 22 are rotating in the direction illustrated by the arrow 45 in FIG. 1, the drive pin 32 sequentially engages the accelerating slots 40a to accelerate the output shaft 14 from zero angular rotational velocity to the maximum rotational velocity while the drive pin 34 alternately engages the deceleration 40b to decelerate the output shaft 18 from a maximum angular rotational velocity to zero rotational velocity.

FIGS. 1 and 3 illustrate the mechanism 11 with the output shaft 18 at rest or at zero angular rotation. As the input shaft 14 rotates in the direction of the arrow 45 through the position shown in FIG. 1, the pins 32 and 34 are out of driving engagement with the slots 40. To hold the output shaft 18 at rest when the pins 32 and 34 are not in engagement with any of the slots 40, a set of locking pins 48 is provided, four in number, which are spaced at equal 90 degree intervals about the output axis 20 and project radially from the surface 28 of the driven element 24, each pin 48 positioned on the bisecting plane of one of the slot pins 40. These pins are also in the form of cylindrical rollers on axes which intersect the intersection point C at the center of the sphere S in the diagram of FIG. 10. When the output element 24 is in the position shown in FIGS. 1 and 3, two adjacent ones of the rollers 48 are in engagement with the driving element 22 on the input shaft 14, resting against an annular retaining surface 49 on the driving element 22. As such, this pair of the rollers 48 holds the output element 24 against rotation on the shaft 18 with the slot pair 41 aligned in the path of rotation of accelerating roller 32. The surface 49 forms a ring about the axis 16 which has an opening or notch 50 therein which allows one of the pins 48 (in FIG. 1, the one of the pins 48 which is centered between the slots of the pair 41) to move through the ring of the surface 49 whenever either of the pins 32 or 34 is in driving engagement with one of the slots 40 of the driven element 24. See, for example, the depiction of the pin/slot relationship in FIG. 5.

Figure 2:
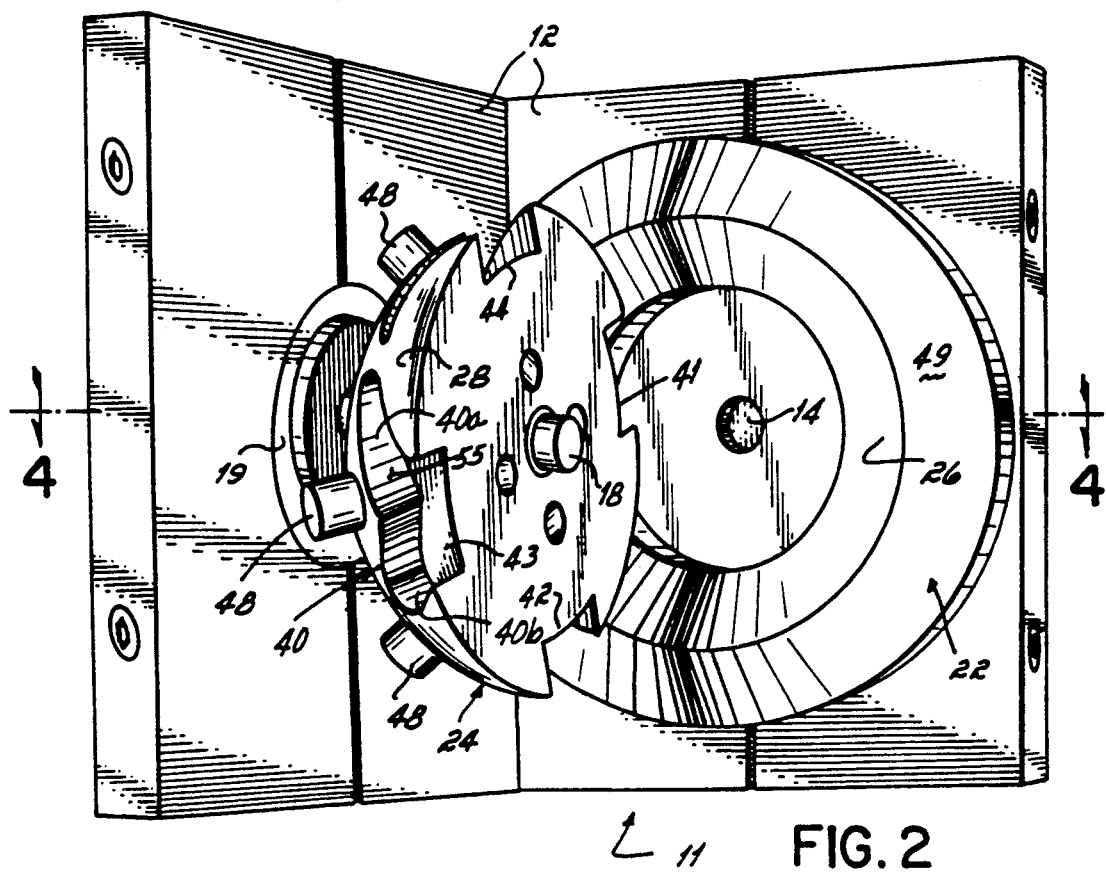
FIG. 2 is a view similar to FIG. 1 of the same embodiment illustrating the output shaft in the rotating condition.
Figure 6:
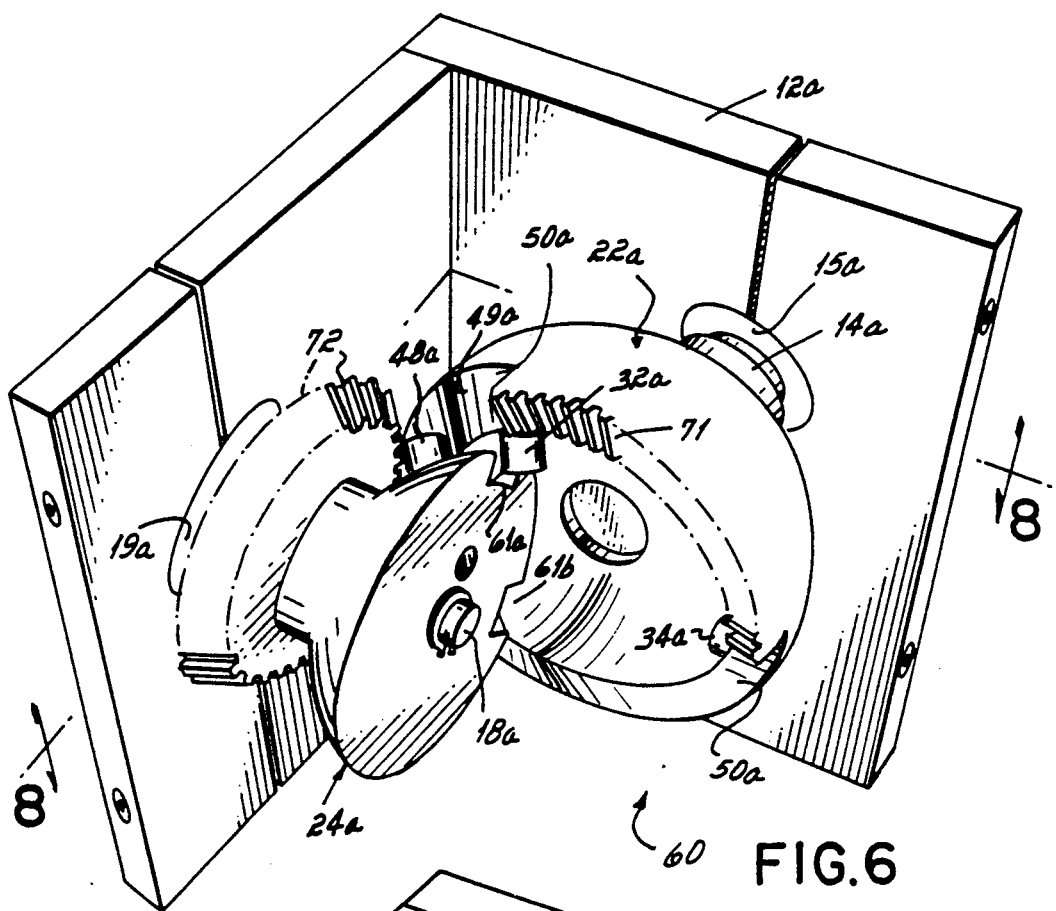
FIG. 6 is the perspective view similar to FIG. 1 of an alternative embodiment of an indexing mechanism, according to the present invention, in which the output is intermittently accelerated to a constant velocity at which it is sustained and then decelerated to zero velocity producing a complete 360 degree revolution of the output shaft.
Figure 7:
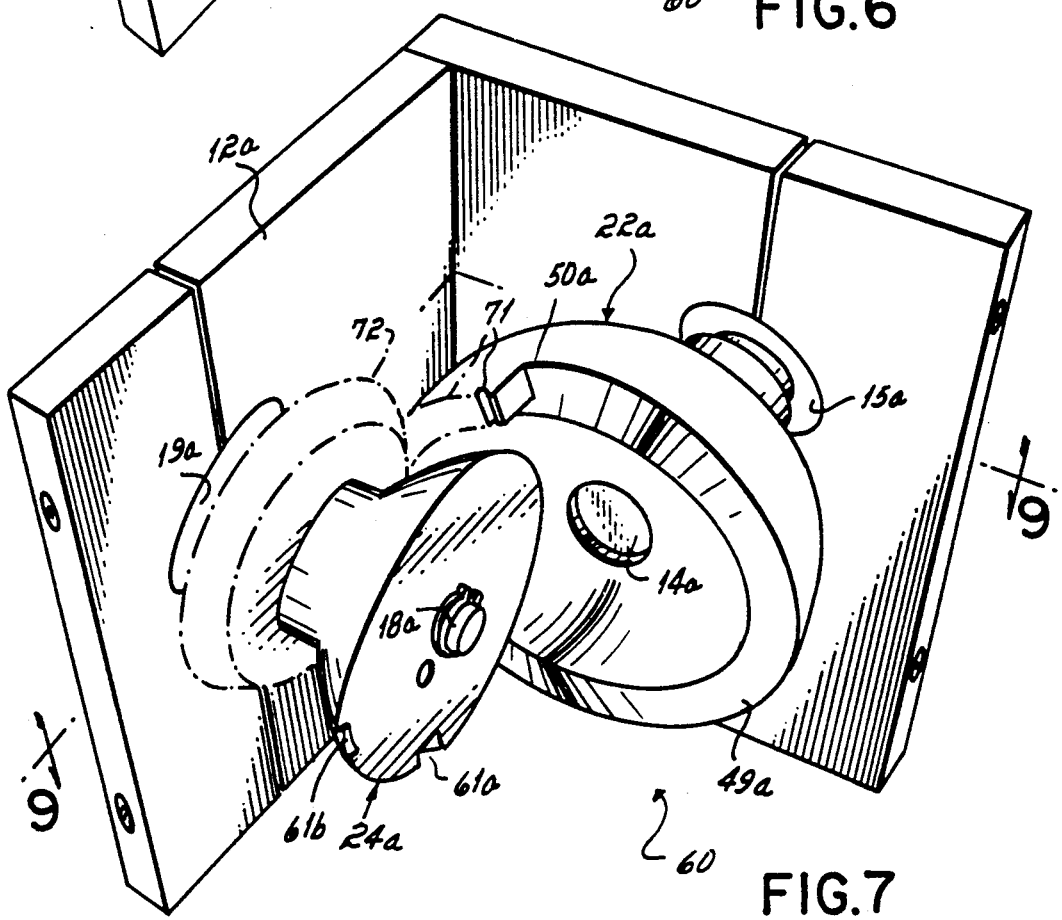
FIG. 7 is a view similar to FIG. 6 illustrating the same embodiment in a position in which the output shaft is moving at constant velocity.
Figure 8:
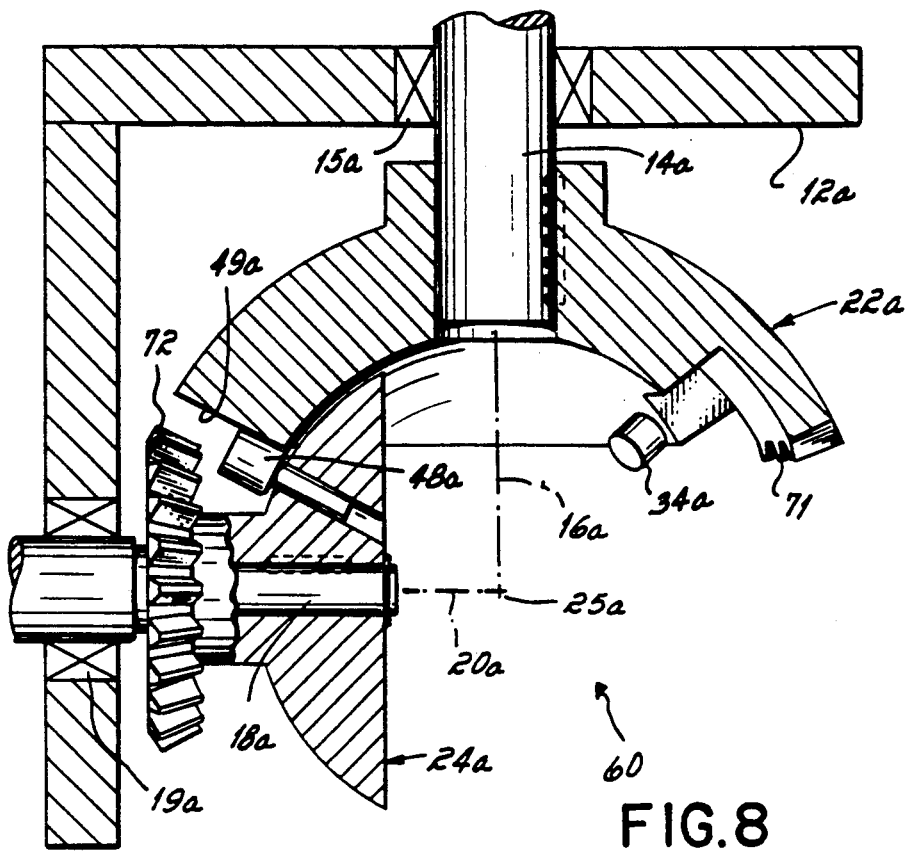
FIG. 8 is a cross-sectional view along the line 8—8 of FIG. 6.
Figure 9:
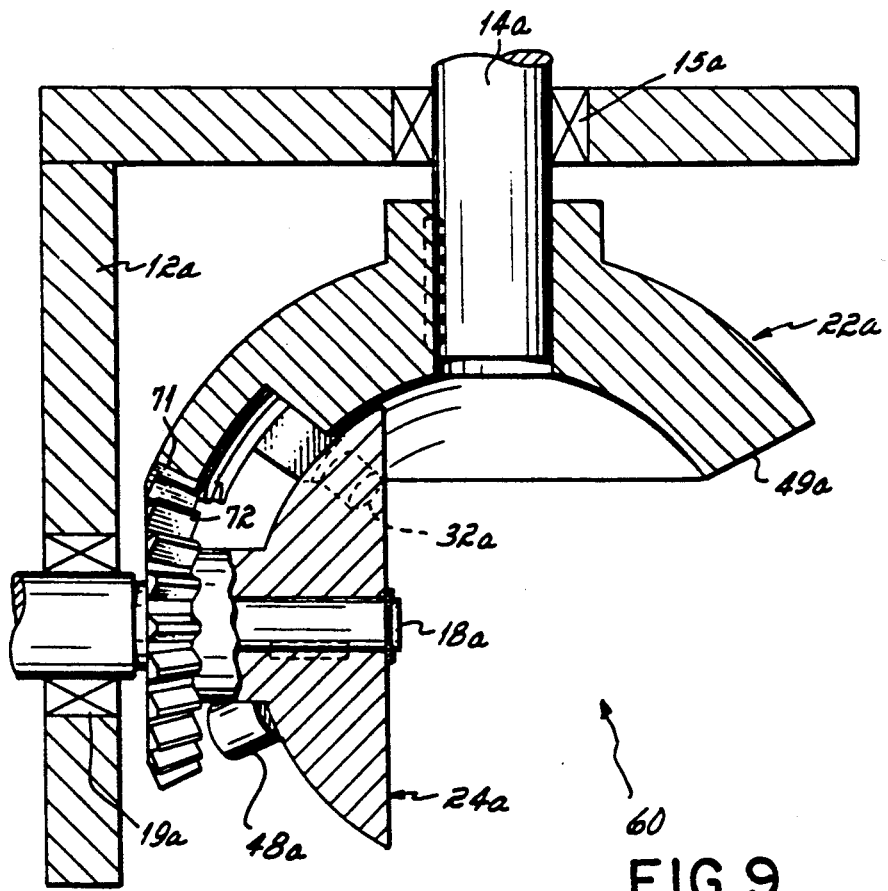
FIG. 9 is a cross-sectional view along the line 9—9 of FIG. 7.

As shown in FIGS. 2, 4 and 5, one of the pins 48 is shown in the notch 50 of the ring 49 as the pins 32 and 34 are in driving engagement with the slots 40a and 40b, respectively, of the slot pair 41. The position shown in FIGS. 2, 4 and 5 is the position of maximum angular rotation and velocity of the output shaft 18, with the notch 50 and a roller 48 lying in the plane of the axes 16 and 18 with the pins 32 and 34 spaced equally on opposite sides of that plane. It is in this position that driving engagement with the slot pair 41 is shifted from contact of the accelerating pin 32 with the accelerating slot 40a to contact of the decelerating pin 34 with the decelerating slot 40b. The magnitude of the maximum angular velocity of the output shaft 18 which is achieved at the point illustrated in FIGS. 2, 4 and 5 can be better understood by reference to FIG. 10.

In FIG. 10, the axis 16 input shaft 14 intersects the axis 20 output shaft 18 at the center C of the sphere S as described above. The input axis 16 intersects the surface S of the sphere at a point A while the output shaft 18 intersects the surface S at point B thereon. The surface S of the sphere intersects the plane which contains the axes 16 and 18 at a circle U. The circle T, which is a circle on which the pins 32 and 34 travel as the input shaft 16 rotates, intersects the circle U at a point F. The maximum angular velocity of the output shaft 18 will, accordingly, equal the product of angular velocity of the input shaft 16 and the ratio of the arc AF to the arc BF in FIG. 10.

Controlling the acceleration and deceleration between zero and maximum angular velocity on the output shaft is accomplished by the shape of the slots 40. The slots 40, or other channel-like structures on the surface 28 of the driven element 24, are bounded by camming surfaces 55 which engage the surface of the pins 32 or 34 to impart the driving motion from the input element 22 to the output element 24. The separate acceleration and deceleration slots on the spherical surface of one of the elements 22 or 24, according to the present invention, provides the capability of controlling the velocity acceleration and jerk characteristics according to the requirements of the application.

For example, in certain applications, it may be desirable that, upon approaching maximum angular velocity, the acceleration smoothly and continuously decrease, but with both the acceleration, and in some cases also the rate of change of acceleration, being zero at the point of transition to maximum angular velocity, when driving contact between the accelerating pin 32 and the accelerating slot 40a, for example, is broken. Similarly, such conditions may also be desired upon the contact or engagement between the decelerating pin 34 and the decelerating slot 40b when beginning to decelerate from maximum angular velocity.

Preferably, for smooth transition is desired to and from zero velocity, the slots are tangent to the circle T at the point of initial contact between the pin 32 and the slot 40a, which occurs at the point illustrated as point D in FIG. 10.

The determination of the point in the cycle at which zero acceleration and rate of change of acceleration may be achieved, for example, may be accomplished by optimizing the value of P with a slot 40a which lies on the circumference of a circle V that is tangent to the circle T at point D and has a center which lies in the plane of the input axis 16 through the point D, as, for example, point E in FIG. 10. Such a circle V will have a radius P about point E. It should be noted that point D is fixed with respect to the surface 26 of the driving element 22 and rotates therewith, while point E is fixed with respect to the surface 28 of the driven element 24 and rotates therewith. Accordingly, as the two spherical surfaces 26 and 28 rotate, four arcs remain constant, the arcs AB, AD, BE, and ED. The movement between the respective components is thus that between the pin 32 with respect to the slot 40a, as the point E rotates about the output axis 20, and as point D rotates about the input axis 16. The deceleration slot 40b would be configured symmetrically to provide just the reverse, with the location of its center E lying in the plane of the point D at which the pin 34 disengages the slot 40b.

Location of the point E and the length of the arc ED, or slot radius, which best provides zero acceleration and jerk upon transition to and from maximum velocity can be determined by the computer program contained in Appendix A hereto, written in Microsoft ® Quick Basic ® version 4.5, or that contained in Appendix B, written in C language.

Another embodiment of the invention is illustrated in FIGS. 6-9. This embodiment is similar to that of FIGS. 1-5, but has provision for additional driving engagement between the driving and driven elements to drive the output shaft at constant velocity after the accelerating pin disengages the accelerating slot and before the decelerating pin engages the decelerating slot.

In the embodiments of FIGS. 6-9 an indexing device 60 is provided wherein the rollers 32a and 34a are spaced on the driving element 22a, which is supported on the end of input shaft 14a, to engage respective acceleration and deceleration slots 61a and 61b provided in the output element 24a, which is supported on the output shaft 18a. The shafts 14a and 18a are respectively supported in bearings 15a and 19a to frame 12a. As with the embodiment illustrated in FIGS. 1-5, in the embodiment illustrated in FIGS. 6-9, the axes 16a and 20a of the shafts 14a and 18a intersect at right angles at a center point 25a, which is analogous to point 25 in the embodiments of FIGS. 1-5 and to point C in FIG. 10.

The slots 61a and 61b correspond in function to the slots 40a and 40b of FIGS. 1-5. The slots 61a and 61b are differently spaced than the slots 40a and 40b to allow for constant velocity rotation after acceleration through engagement of the pin 32a with slot 61a and before deceleration by engagement of the pin 34a in the slot 61b. The constant velocity is maintained by a bevel driving gear segment 71 on driving element 22a positioned to intermittently engage a mating bevel driven gear 72 on the element 24a. The length of the arc of the driving gear segment 71 and the gear ratio between the gears 71 and 72 may be selected at any value desired for the constant velocity rotation angle of the output shaft 18a.

The slots 61a and 61b may be, however, of a different optimal shape than the shape preferred for the embodiments of FIGS. 1-5. Preferably, for the embodiments of FIGS. 6-9, the slots are also circular and shaped by selecting a slot radius either empirically or by solution of the equations as set forth in the program of the attached appendix, to provide zero acceleration and jerk, or rate of change of acceleration at the points where the mating gears 71 and 72 make and break engaging contact with each other.

The output element 24a further is provided with a pair of locking rollers 48a which, as with the rollers 48 of the embodiment of FIGS. 1-5, function to lock the output element 24a and thus the output shaft 18a against rotation during the zero motion portion of the indexing cycle, before acceleration from zero by engagement of the acceleration slot 61a by the acceleration pin 60a, and after disengagement of the deceleration slot 61b by the deceleration pin 60b. The locking motion of the pins 48a is achieved by the locking ring segment 49a on the driving element 22a, which partially surrounds the input shaft 14a. The ring segment 49a, as with the ring 49 of FIGS. 1-5, is provided with a notch 50a to release the pin 48a and allow the output element 24a and output shaft 20a to rotate when being driven by the either the gear 71 or pins 32a and 34a of the input element 22a.

The preferred indexing mechanism may be considered as a 4-bar linkage laid out on a sphere. The four links, or constant arc lengths, are the four arcs AB, AD, BE and DE described above in connection with FIG. 10. The design involves spherical trigonometry. The arcs AB and AD will be given values, and the arcs BE and DE may be derived empirically or by the computer program of the appendix. The variables representing the links and initial angles which constitute the design parameters are, with reference to FIG. 10, as follows:

SA = Shaft Angle link (arc AB)
$\delta$ = Drive link (arc AD)
P = Slot Curvature link (arc DE)
$\eta$ = Follower link (arc BE)
$\alpha$ = Initial Drive angle (spherical triangle BAD)
$\beta$ = Initial Driven angle (spherical triangle ABD)

In FIG. 10, arcs CA, CB, CD and CE are equal. All links are located on the surface of a sphere with constant radius. THe initial angles $\alpha$ and $\beta$ are the angles at the points where the corresponding pins and slots make or break contact at zero angular velocity.

Design considerations allow the use of what may be called the "gearless" (FIGS. 1-5) and the "geared" (FIGS. 6-9) embodiments, with the geared embodiment utilizing bevel gearing for a constant velocity portion of the index period. The axes of the drive rollers 32 or 34, located at point D, should pass through the center of the sphere located at point C.

The "gearless" system has a fixed $\alpha$ and $\beta$ relationship depending on the intermittent or output arc selected. Optimization of rho gives kinematic values of zero acceleration and the lowest jerk (pulse) at mid-motion, or maximum velocity, where torque reversal occurs. This system is preferred for fractional output indexing (i.e., 3-stop, 4-stop, 5-stop, etc.). With the "geared" system motion selection is dependent on peak (terminal) velocity or gear ratio, where the solution provides the initial value of $\alpha$, the initial value of $\beta$, and rho give kinematic values of zero acceleration and zero rate of change of acceleration or jerk (pulse) for smooth transition into the "geared" (constant velocity) portion of the index period. This system is useful for some fractional output indexing and is preferred for multi-revolution output indexing (i.e., 1 revolution, 1½ revolution, 2 revolution, etc.).

Other variables used in the computer program of the appendix are as follows:

BETAMINUS = $\beta$ − − = Angle between arcs BD and DE
SA = shaft angle or angle between CA and CB, e.g., $\pi/2$ for a 90 degree mechanism, which is a constant
deltaD = $\delta$ = drive link or arc length between drive pin and input axis
rho = P = Slot curvature link or slot curve radius arc length from E to D when pin is in slot, which is a constant
Topleg = $\eta$ = arc BE between output axis and center of slot curvature circle, which is a constant
THETA = angle between BD and AB (intermittent output motion)
BETA3 = THETA
BETA0 = BETA3 or THETA at point of initial (or final) contact as the accelerating (or the decelerating) drive pin enters (or leaves) a slot (defined as the initial condition point)
CAPALPHA = angle between AD and AB (constant input motion)
ALPHA0 = CAPALPHA at point of initial condition point
longleg = deltaD + rho at initial condition point
GAMMA0 = angle between AD and BD at initial condition point The objective of the optimization which is accomplished by the program is to solve for ALPHA0, BETA0, rho and topleg.

One specific solution of a gearless embodiment illustrated in FIGS. 1-5, is a four stop drive for producing 90° of output shaft rotation for 90° of input shaft rotation, with the output shaft at rest for 270° of input shaft rotation. For such an embodiment, the design having parameters will have the following values for both the acceleration slots and the deceleration slots, with the slots being mirror images of each other in a bisecting plane through the output axis:

SA = 90°
$\alpha$ = 22.5°
$\beta$ = 22.5°
$\delta$ = 47.2658°
P = 66.9488°
$\eta$ = 32.5851°

One specific solution of a geared embodiment illustrated in FIGS. 6-9, is a one half revolution indexing mechanism which produces 180° of output shaft rotation for 230° of input shaft rotation, with the output shaft at rest for 130° of the rotation of the input shaft. For such a geared design, the parameter values are as follows:

SA = 90°
$\alpha$ = 38.1728°
$\beta$ = 25.9137°
$\delta$ = 38.1738°
P = 51.8373°
$\eta$ = 38.1738°
Gear ratio = 1 to 1
Driving gear arc = Total output angle $-(4\beta$/gear ratio) $+4\alpha$ = 130.96

While only preferred embodiments of the invention are described, persons skilled in the art to which it applies will readily appreciate changes and modifications which may be made without departing from the spirit of the invention. Therefore, the limitations herein are intended only to be those set forth in the claims.

We claim:

1. An indexing mechanism for rotatably driving an output shaft intermittently with respect to the rotation about an input axis of an input shaft, and about an output axis which intersects the input axis at an intersection point, the mechanism comprising:

a driving element mounted on the input shaft to rotate therewith about the input axis, the driving element including a pair of drive pins spaced from each other and both at the same distance from the input axis, the pins being mounted on the driving element to move therewith in a plane perpendicular to the input axis and in a circle on the surface of an imaginary sphere centered at said intersection point;

a driven element mounted on the output shaft to rotate therewith about the output axis, the driven element having at least one pair of curved cam channels formed thereon, each pair of channels including a first channel and a second channel, the channels lying on and being curved along the surface of said imaginary sphere about center points spaced from the center of the sphere and positioned so as to matingly engage the drive pins for intermittent drive of the driven element as the driving element rotates;

the pair of drive pins including a first pin moveable in the first channel of one of the channels of a pair for engaging and angularly accelerating the driven element from a zero angular velocity to a maximum angular velocity with an acceleration that increases from a low initial magnitude to a moderately low maximum and then decreases to zero, and a second pin moveable in the second channel of one of the channels of a pair for engaging and angularly decelerating the driven element from the maximum angular velocity to the zero angular velocity with a deceleration that increases in magnitude from zero to the maximum and then decreases to a low final magnitude.

2. The indexing mechanism of 1 wherein one of the channels includes cam surface means for smoothly decreasing the acceleration of the driven element from a maximum acceleration to zero acceleration as the driven element approaches the maximum velocity, and for smoothly increasing the deceleration from a zero deceleration to a maximum deceleration as the driven element begins to decelerate from the maximum velocity.

3. An indexing mechanism for rotatably driving an output shaft intermittently with respect to the rotation about an input axis of an input shaft, and about an output axis which intersects the input axis at an intersection point, the mechanism comprising:

a driving element mounted on the input shaft to rotate therewith about the input axis, the driving element including a pair of drive pins spaced from each other and both at the same distance from the input axis, the pins being mounted on the driving element to move therewith in a plane perpendicular to the input axis and in a circle on the surface of an imaginary sphere centered at said intersection point;

a driven element mounted on the output shaft to rotate therewith about the output axis, the driven element having at least one pair of cam channels formed thereon, each pair of channels including a first channel and a second channel, the channels lying on the surface of said imaginary sphere and positioned so as to matingly engage the drive pins for intermittent drive of the driven element as the driving element rotates;

the pair of drive pins including a first pin moveable in the first channel of one of the channels of a pair for engaging and angularly accelerating the driven element from a zero angular velocity to a maximum angular velocity and a second pin moveable in the second channel of one of the channels of a pair for engaging and angularly decelerating the driven element from the maximum angular velocity to the zero angular velocity;

means disposed on the driving element for uniformly driving the driven element, when matingly engaged therewith, through a predetermined arc at the maximum angular velocity; and means disposed on the driven element for matingly engaging said driven element driving means after the acceleration and before the deceleration of the driven element.

4. An indexing mechanism for rotatably driving an output shaft intermittently with respect to the rotation about an input axis of an input shaft, and about an output axis which intersects the input axis at an intersection point, the mechanism comprising:

a driving element mounted on the input shaft to rotate therewith about the input axis, the driving element including a pair of drive pins spaced from each other and both at the same distance from the input axis, the pins being mounted on the driving element to move therewith in a plane perpendicular to the input axis and in a circle on the surface of an imaginary sphere centered at said intersection point;

a driven element mounted on the output shaft to rotate therewith about the output axis, the driven element having at least one pair of cam channels formed thereon, each pair of channels including a first channel and a second channel, the channels lying on the surface of said imaginary sphere and positioned so as to matingly engage the drive pins for intermittent drive of the driven element as the driving element rotates;

the pair of drive pins including a first pin moveable in the first channel of one of the channels of a pair for engaging and angularly accelerating the driven element from a zero angular velocity to a maximum angular velocity and a second pin moveable in the second channel of one of the channels of a pair for engaging and angularly decelerating the driven element from the maximum angular velocity to the zero angular velocity; and a plurality of mating gear teeth, including driving gear teeth disposed on the driving element and driven gear teeth disposed on the driven element, the driven gear teeth being positioned so as to matingly engage said driving gear teeth immediately following the acceleration of the driving element by the first pin and until immediately preceding the deceleration of the driven element by the second pin.

5. The indexing mechanism of any of claims 3 or 4 wherein a first one of the channels includes cam surface means for smoothly decreasing the acceleration of the driven element from a maximum acceleration to zero acceleration as the driven element accelerates to the maximum velocity, and wherein a second one of the channels includes cam surface means for smoothly increasing the deceleration from a zero deceleration to a maximum deceleration as the driven element decelerates from the maximum velocity.

6. The indexing mechanism of claim 5 wherein the cam surface means of the first one of the channels includes means for smoothly reducing the rate of change of the acceleration of the driven element to zero as the driven element approaches maximum velocity, and wherein the cam surface means of the second one of the channels includes means for smoothly increasing the rate of change of deceleration of the driven element from zero deceleration as the driven element decreases from the maximum velocity.

7. The indexing mechanism of any of claims 1–4 wherein the channels include walls of the channels which are curved along the surface of the sphere to produce said angular velocities, acceleration and deceleration.

8. The indexing mechanism of any of claims 1 3, or 4 wherein the channels include walls of the channels which are curved along the surface of the sphere to cause the acceleration to smoothly approach zero acceleration at the maximum angular velocity.

9. The indexing mechanism of any of claims 1 or 4 wherein the channels include walls of the channels which are curved along the surface of the sphere so as to reduce the rate of change of acceleration and deceleration of the driven element upon accelerating to and decelerating from the maximum angular velocity.

10. The indexing mechanism of any of claims 1 3, or 4 wherein the channels include walls of a channel which lie on a circle on the surface of the sphere, the curve being approximately tangent to, and having a center lying outside of, the circle of movement of the drive pins at a point of engagement of a pin by a channel upon acceleration to or deceleration from maximum angular velocity.

11. The indexing mechanism of any of claims 1 or 2 wherein said pair of channels is one of a plurality of identical pairs of channels equally spaced around the output axis.

12. The indexing mechanism of any of claims 1–4 further comprising means for locking the output shaft against rotation at the zero angular velocity.

13. The indexing mechanism of claim 12 wherein the locking means includes:
  a circular ring on the driving element concentric with the input shaft and rotatable with the driving element; and
  a pair of locking pins angularly spaced on the driven element and positioned so as to engage the ring when the driven element is at the zero velocity to imobilize the driven element;
  the ring having a space therein to permit one of the locking pins to pass through the ring to release the driven element for rotation on the output shaft when the drive pins are engaged by the channels.

14. An indexing mechanism for rotatably driving an output shaft intermittently with respect to the rotation about an input axis of an input shaft, about an output axis which intersects the input axis at an intersection point, the mechanism comprising:
  first and second elements including:
    a driving element mounted on the input shaft to rotate therewith about the input axis; and
    a driven element mounted on the output shaft to rotate therewith about the output axis;
  the first one of the elements including drive pin means mounted thereon to move therewith in a plane perpendicular to its axis and in a circle on the surface of an imaginary sphere centered at said intersection point;
  the second one of the elements having curved cam channel means formed thereon lying on and curved along the surface of said imaginary sphere about center points spaced from the center of the sphere and positioned so as to matingly engage the drive pin means for intermittent drive of the driven element as the driving element rotates;
  the channel means including two curved channel segments, one segment being shaped to cooperate with the drive pin means to intermittently angularly accelerate the driven element from a zero angular velocity to a maximum angular velocity with an acceleration that increases from a low initial magnitude to a moderately low maximum and then decreases to zero, and the other segment being shaped to cooperate with the drive pin means to angularly decelerate the driven element from the maximum angular velocity to the zero angular velocity with a deceleration that increases in magnitude from zero to the maximum and then decreases to a low final magnitude.

15. The indexing mechanism of claim 14 wherein the channel means includes cam surface means for smoothly decreasing the rate of change of acceleration of the driven element from maximum acceleration to zero acceleration as the driven element approaches maximum velocity, and for smoothly increasing the deceleration from zero deceleration to maximum deceleration as the driven element decelerates from maximum velocity.

16. The indexing mechanism of 14 wherein the channel means includes cam surface means for smoothly decreasing the acceleration of the driven element from a maximum acceleration to zero acceleration as the driven element approaches the maximum velocity, and for smoothly increasing the deceleration from a zero deceleration to a maximum deceleration as the driven element begins to decelerate from the maximum velocity.

17. The indexing mechanism of claim 14 wherein the channel means includes walls which are curved along the surface of the sphere to cause the acceleration to smoothly approach zero acceleration at the maximum angular velocity.

18. The indexing mechanism of claim 14 further comprising means for locking the output shaft against rotation at the zero angular velocity.

19. An indexing mechanism for rotatably driving an output shaft intermittently with respect to the rotation about an input axis of an input shaft, about an output axis which intersects the input axis at an intersection point, the mechanism comprising:
  first and second elements including:
    a driving element mounted on the input shaft to rotate therewith about the input axis; and
    a driven element mounted on the output shaft to rotate therewith about the output axis;
  the first one of the elements including drive pin means mounted thereon to move therewith in a plane perpendicular to its axis and in a circle on the surface of an imaginary sphere centered at said intersection point;
  the second one of the elements having cam channel means formed thereon lying on the surface of said imaginary sphere and positioned so as to matingly engage the drive pin means for intermittent drive of the driven element as the driving element rotates;
  the channel means including two curved channel segments, one segment being shaped to cooperate with the drive pin means to intermittently angularly accelerate the driven element from a zero angular velocity to a maximum angular velocity and the other segment being shaped to cooperate with the drive pin means to angularly decelerate the driven element from the maximum angular velocity to the zero angular velocity;
  means disposed on the driving element for uniformly driving the driven element through a predetermined arc at the maximum angular velocity; and
  means disposed on the driven element for matingly engaging said driven element driving means after the acceleration and before the deceleration of the driven element.

20. The indexing mechanism of claim 19 wherein the channel means includes cam surface means for smoothly decreasing the rate of change of acceleration of the driven element from maximum acceleration to zero acceleration as the driven element approaches maximum velocity, and for smoothly increasing the deceleration from zero deceleration to maximum deceleration as the driven element decelerates from maximum velocity.

21. The indexing mechanism of any of claims 14 or 19 wherein the channels means includes walls which are curved along the surface of the sphere to cause the acceleration and the time rate of change of acceleration to smoothly approach zero at the maximum angular velocity.

* * * * *